May 2, 1967
H. NEUMEISTER
3,317,783
PICTURE TUBE WITH SYMBOL DISPLACEMENT BY MANUALLY ACTUATED SIGNAL GENERATOR
Filed Feb. 12, 1964
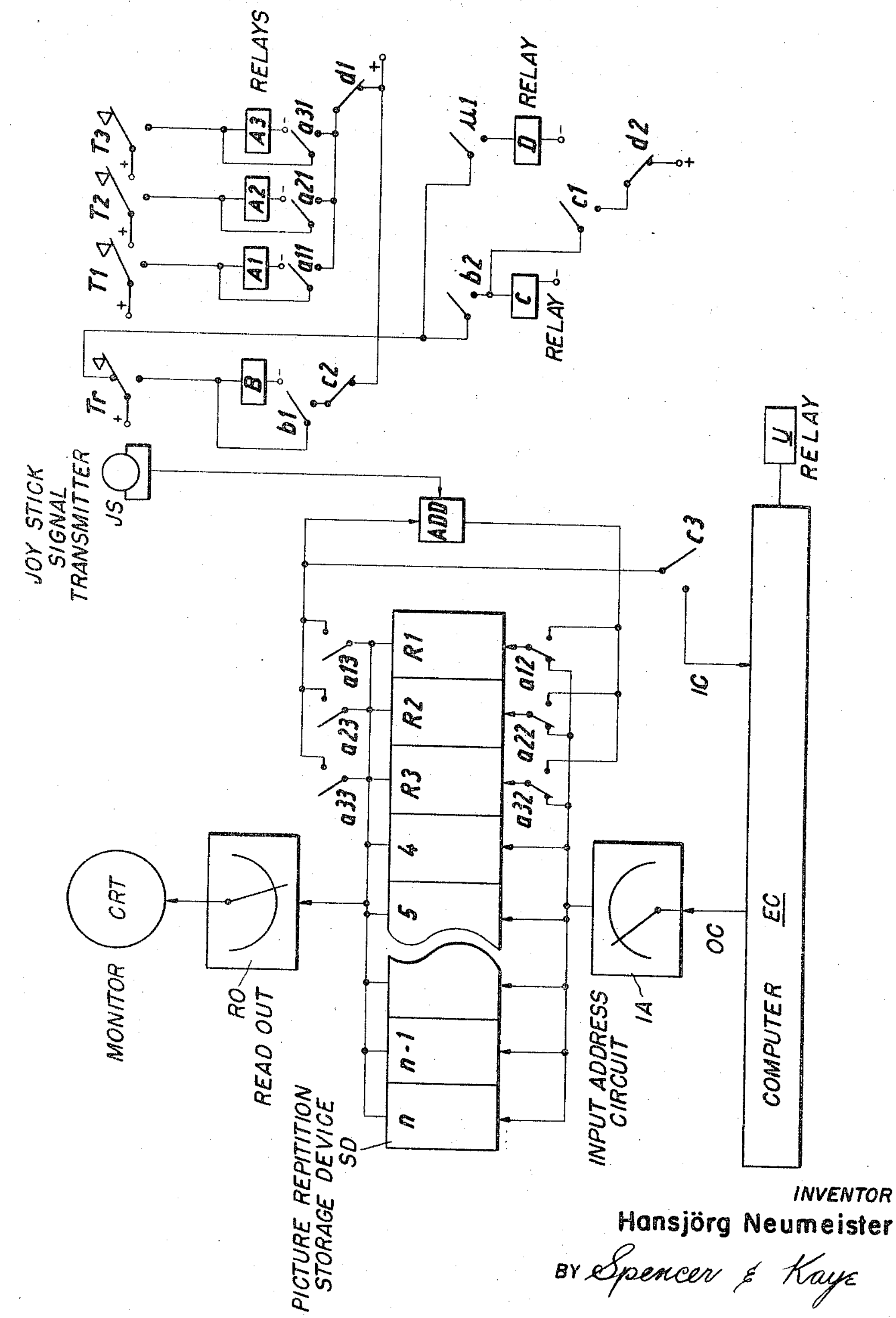
INVENTOR
Hansjörg Neumeister
BY Spencer & Kaye
ATTORNEYS United States Patent Office 3,317,783

Patented May 2, 1967

3,317,783

PICTURE TUBE WITH SYMBOL DISPLACEMENT BY MANUALLY ACTUATED SIGNAL GENERATOR

Hansjörg Neumeister, Essen, Germany, assignor to Telefunken Patentverwertungsgesellschaft m.b.H., Hannover-Linden, Germany Filed Feb. 12, 1964, Ser. No. 351,589
Claims priority, application Germany, Feb. 12, 1963, T 23,503
7 Claims. (Cl. 315—26)

The present invention realtes generally to the electronic display art, and, more particularly, to an arrangement providing for the manual displacement of marker positions upon a picture tube.

In the picture tube art wherein the tubes are used for displaying traffic patterns and the control is carried out by means of a radar device or an electronic computer providing traffic data, it is known to provide a manually actuated signal generator or transmitter which may, for example, be the "rolling ball" or "joy stick" type. By means of actuation of such signal transmitters, a marker can be moved across the picture screen so as to represent the position of an object. The signal transmitter produces voltages for this purpose which provide the deflection voltages for the electron beam which are required for the desired marker movements.

In controlling or partially controlling picture representation by means of an electronic computer, it is known to first feed the information regarding picture representation which is provided by the computer to a digital storage device from which the information can be read out in a cyclic repeating manner in order to provide picture repetition. The read-out is provided with time period spacings which are sufficiently short so that there is no flickering. The information is then made effective for beam deflection by means of a digital-to-analog converter. If a symbol writing tube is used, the information controls two deflection systems, one for selecting the shape or form of the symbols, and one for positioning the symbols on the screen. Also, they provide intensity or brightness modulating signals.

With this prior art in mind, it is a main object of the present invention to provide an arrangement which produces beam deflection data for a picture tube and which includes a computer and a manually actuated signal generator so that the marker or symbol can be manually displaced.

Another object of the present invention is to provide an arrangement of the character described wherein a marker which is set in place by hand can be further controlled by the computer, and the marker controlled by the computer can be corrected in its position by manual means.

A further object of the present invention is to provide a device of the character described wherein registers are provided for storing the marker position information and wherein there may be data transmission in both directions between the computer and the registers.

These objects and others ancillary thereto are accomplished in accordance with preferred embodiments of the invention wherein signals from the manually actuated generator or transmitter may be fed to at least one register which can be connected to or provided with adder devices. This register is connected with an electronic computer to provide for data transmission and the contents of the register can be read out directly for producing beam deflection signals.

The register is a part of a digital storage device which can be interrogated in a cyclic manner to provide picture repetition. Devices are provided between the register and the computer so that data transmission can take place in both directions between the two. Preferably, the construction is such that the output of the register is connected or may be connected together with the input of an adder-subtracter circuit, as may the output of the manually actuated transmitter which provides signals in the form of pulses. The input of the register is connected or may be connected with the output of the adder-subtracter device.

In a preferred embodiment, several registers which are components of a repetition storage device are selectively connectible for receiving signals from the manually actuated signal generator and for the transmission of data to the computer. A common adder-subtracter circuit may be used for the registers and to which the registers are selectively connectible. Preferably, key-actuated switching devices are provided for selecting the registers and for the transmission functions.

Additional objects and advantages of the present invention will become apparent upon consideration of the following description when taken in conjunction with the accompanying drawings in which:

The figure is a schematic circuit diagram in block form of an embodiment of the present invention.

Before considering the preferred embodiment in detail, is should be noted that the present invention is advantageous because a marker which is set by hand can be further controlled by the computer, and a marker which is controlled by the computer can have its position corrected by hand. Since the register of the storage device retains the respectively last position of the marker, it is not necessary to always move the marker to the desired location from an initial position which may, for example, be at the picture edge and thus across a rather large distance. Because the register or registers are incorporated into the picture storage device, the contents of the register or registers as the contents of the other storage blocks, are fed cyclically to the monitor tube, and a special gating circuit for the marker which is moved by the manually actuated signal generator is not necessary. By arranging several registers as mentioned above, it is possible to manually adjust several markers on the picture screen by means of the signal generator and to subject them to the computer control and to correct them again manually.

With more particular reference to the drawing, an electronic computer EC is shown which has an output channel OC and an input channel IC, and further includes a picture repetition storage device SD which may, for example, be in the form of a core matrix storage device. The picture data are fed to this picture repetition storage device from the computer by means of an input address circuit IA, and the output to the monitor screen for cyclic reading takes place by means of the read-out circuit RO. The arrangement includes a picture screen tube CRT providing the monitor screen and which is connected to the read-out device RO. The arrangement may be a parallel or series type, as desired. The control of the electron beam of the monitor tube CRT in dependence on the digital data emerging from the read-out device RO is effected via a digital-to-analog converter, as is known in the art.

A manually actuated generating device of the type referred to as a joy stock device JS is also included in this arrangement and is of the type having a pulse output. Such a rolling ball or joy stock generator produces pulses, separately for the $x$ and $y$ direction. This may be done by providing two toothed wheels, one of which is driven by an axle corresponding to the $x$ direction, and the other by an axle corresponding to the $y$ direction, the two axles being actuated by a joy stick in known manner. In the case of a rolling ball, each wheel may be driven by a friction disc which is rotatable by being friction driven by the rolling ball. The planes of the two discs are oriented according to the two main directions such as in the $x$ and $y$ directions. When a wheel rotates, pulses can be generated by its teeth acting sequentially upon a contact, or an electromagnetic pole, or a photoelectric sensor.

At the right portion of this figure a number of key-actuated switching devices are provided for controlling the transmission processes and these devices are, in the present embodiment, constructed with relays. However, they can also, without difficulty, be provided in the form of electronic switches.

The data which determine the positions and, under certain circumstances, also the shape of a signal upon the picture screen are provided in respectively one of the blocks $l$ through $n$ of the storage device SD. The first three blocks have an R placed in front of their respective numbers which indicates that these blocks are registers, and they can be actuated or controlled by means of the joy stick generator.

By means of one of the keys T1, T2 or T3, the joy stick generator JS can be switched or connected to one of these registers. Assuming that the register R1 is to be used, the key T1 will be depressed so that a holding relay A1 will become energized. This relay acts as a holding relay by means of a holding contact $a$11 and a relay contact $d$1. By means of a contact $a$12 the input of the register R1 is disconnected from the output of the input address system IA which corresponds to this input and is connected to the output of an adder-subtracter circuit ADD. By means of a contact $a$13 the output of this register R1 is connected to the input of the circuit ADD. Also, the output of register R1 remains continually connected with the read-out circuit RO so that the contents of register R1 is still provided at the indicator or monitor.

By actuating the joy stick generator JS pulses are fed to the input of the circuit ADD. These pulses divided into the $x$ and $y$ directions correspond to a desired change of the coordinate position of the marker which is produced by the register R1 and they are combined in the circuit ADD (depending upon the direction of the change, either additively or subtractively) with the previous contents of R1 and this result is again incorporated into the register R1 by means of the contact $a$12. Thus, the marker on the picture screen is shifted or displaced to correspond to the changed data which is fed into the arrangement by means of the generator JS.

In order to transfer the data in register R1 to the computer EC and to again disconnect the register R1 from the generator JS, a key-type switch T$r$ is depressed. A holding relay B thus becomes energized and the relay holds by means of a holding contact $b$1 and a relay contact $c$2. This condition prevails until the key T$r$ has returned to its rest or non-depressed position at which time a holding relay C is energized by means of contact $b$2 and key T$r$. The relay C de-energizes relay B by opening contact $c$2. Relay C is a holding relay due to the holding contact $c$1 and a relay contact $d$2.

During the period of time that relay C is energized, the contents of register R1 are transferred, by means of contact $a$13 as well as a contact $c$3 of the relay C, into the input channel IC and thus into the computer EC. A contact $u$1 is closed by computer-controlled relay U at the end of this operation and renders a relay D active to restore the initial position by de-energizing the relay A1 by opening the contact $d$1 and by de-energizing the relay C by opening the contact $d$2. The input connection to register R1 is switched back by means of a contact $a$12 to the normal input IA and its output is disconnected from the adder ADD because the contact $a$13 opens. The relay U is then de-energized and contact $u$1 is opened.

After having received the contents of the storage element R1 the computer EC can continuously correct the marker positions, for example, when pursuing or tracking an object. The joy stick generator is then free so that another marker can be fed to the monitor via one of the other registers R2 or R3 which can be actuated in a manner similar to the above-described operation in connection with the actuation of register R1, by using the respective key T2 or T3 as well as the key T$r$. Also, after again actuating the key T1, a further manual correction of the marker position determined by the contents of R1 can be carried out.

It will be understood that the above description of the present invention is susceptible to various modifications, changes and adaptations, and the same are intended to be comprehended within the meaning and range of equivalents of the appended claims.

What is claimed is:

1. A device for producing beam deflection signals for a picture screen tube, comprising, in combination:
   picture repetition storage means including at least one register, the contents of which can be directly removed for obtaining beam deflection signals;
   computer means having its output connected to said storage means for providing beam deflection data;
   manually actuated signal generator means; and
   adder-subtracter means arranged for connection to receive the output of said generator means and the output of said register and to feed its output to the input of said register.

2. A device as defined in claim 1 wherein several registers are provided, and further comprising means selectively connecting said registers for the reception of signals from the manually actuated signal generator means and for data transmissions to the computer means.

3. A device for producing beam deflection signals for a picture screen tube, comprising, in combination:
   picture repetition storage means including a plurality of registers, the contents of which can be directly removed for obtaining beam deflection signals;
   computer means having its output connected to said storage means for providing beam deflection data;
   manually actuated signal generator means; and
   adder-subtracter means arranged for selective connection to receive the output of said generator means and the output of one of said registers and to feed its output to the input of said one register.

4. A device as defined in claim 3 comprising key actuated switching means for selectively connecting one of the registers with one of: (1) the adder-subtracter means and (2) the computer, and a further key-actuated switching device for transferring the contents of a selected register to the computer.

5. A device as defined in claim 4 comprising a storage read-out circuit, the outputs of the registers being continuously connected with the storage read-out circuit.

6. A device for producing beam deflection signals for a picture screen tube, comprising, in combination:
   picture repetition storage means including at least one register;
   computer means having its output connected to said storage means for providing beam deflection data;
   manually actuated signal generator means;
   adder-subtracter means connected to receive the output of said generator means and connectible to receive the output of said register and to feed its output to the input of said register;
   means for selectively connecting said adder-subtracter means to receive the output of said register and to provide its output to the register input and for disconnecting the register input from said computer means, and for selectively disconnecting the register input and output from the adder and connecting the register input to said computer means; and
   further means for selectively connecting the output of said register to said computer means.

7. A device for producing beam deflection data for a picture screen tube, comprising, in combination:
   picture repetition storage means including at least one register;

means connected to said storage means for directly reading out the contents of said storage means for obtaining beam deflection signals;

monitor means connected to receive and be controlled by the beam deflection data signals from the reading out means;

input address circuit means connected as input to said storage means;

computer means having its output connected to said input address circuit means for providing beam deflection data in response to data fed thereto;

manually actuated signal transmitter means;

adder-subtracter means connected to receive the output of said transmitter means and connectible to receive the output of said register and to feed its output to the input of said register;

selectively actuated switching means for selectively connecting said adder-subtracter means to receive the output of said register and to provide its output to the register input and for disconnecting the register input from said circuit means, and for selectively disconnecting the register input and output from the adder and connecting the register input to said circuit means; and further switching means for selectively connecting the output of said register to said computer means.

References Cited by the Examiner

UNITED STATES PATENTS

| | | | |
|---|---|---|---|
| 2,648,061 | 8/1953 | Parker | 343—7.9 |
| 2,819,461 | 1/1958 | Bryan | 315—18 X |
| 2,962,625 | 11/1960 | Berwin | 315—26 |
| 3,200,196 | 8/1965 | Jenkins | 315—26 X |

DAVID G. REDINBAUGH, *Primary Examiner.*

T. A. GALLAGHER, *Assistant Examiner.*